United States Patent [19]

Faggin et al.

[11] 4,010,449
[45] Mar. 1, 1977

[54] MOS COMPUTER EMPLOYING A PLURALITY OF SEPARATE CHIPS

[75] Inventors: Federico Faggin, Cupertino; Masatoshi Shima, Santa Clara, both of Calif.; Stanley Mazor, Brussels, Belgium

[73] Assignee: Intel Corporation, Santa Clara, Calif.

[22] Filed: Dec. 31, 1974

[21] Appl. No.: 537,648

[52] U.S. Cl. .......................................... 340/172.5
[51] Int. Cl.² ........................................ G06F 13/00
[58] Field of Search ................... 340/172.5; 445/1

[56] References Cited
UNITED STATES PATENTS 3,757,306  9/1973  Boone .................... 340/172.5
3,821,715  6/1974  Hoff et al. ............... 340/172.5
3,855,577  12/1974  Vandierendonck ........ 340/172.5

*Primary Examiner*—Harvey E. Springborn
*Attorney, Agent, or Firm*—Spensley, Horn & Lubitz

[57] ABSTRACT

A metal-oxide-semiconductor (MOS) computer wherein the bidirectional data bus lines which communicate with the central processing unit (CPU) are also utilized to convey CPU status information to a status latch, thereby eliminating pin connections otherwise required to convey status information from the CPU. A special jump instruction of all zeroes or ones is used eliminating components associated with the prior art application of such instructions to the CPU.

3 Claims, 2 Drawing Figures

MOS COMPUTER EMPLOYING A PLURALITY OF SEPARATE CHIPS

BACKGROUND OF THE INVENTION

1. Field of the Invention

The invention relates to the field of MOS computers, U.S. Class 340/172.5.

2. Prior Art

General purpose digital computers employing a plurality of MOS chips such as a CPU chip, random-access-memory (RAM) chips and read-only-memory (ROM) chips are known in the prior art. For example, see U.S. Pat. No. 3,821,715.

It is often desirable to know the status of the CPU, for example, whether it is halted or communicating with an input/output bus or a plurality of other conditions. Such status determinations are well known in the prior art. As will be discussed in more detail in conjunction with FIG. 1 which shows a portion of the circuitry of the 8008 Microprocessor marketed by Intel Corporation in March, 1972 and described in Section 2 — Processor Timing and Section 5 — Processor Control Signal of the MCS-8 User Manual therefor, in the prior art (particularly in a multi-chip MOS computer) in order to determine the status of the CPU, an encoded signal is generated by the CPU and communicated to a decoder. The encoded signal is then decoded by the decoder resulting in a CPU status signal such as halted, input/output, etc. The encoded CPU status signal required that a plurality of lines be used to communicate the status from the CPU to the decoder. This plurality of lines required additional pin connections to the CPU chip. In the fabrication of an MOS computer these additional pin connections to the CPU are burdensome, costly or may require the use of pins needed to perform other functions. As will be seen, the present invention eliminates the need for the pins associated with the encoded processor status signal.

Again, as will be discussed more fully in conjunction with FIG. 1, a special instruction or jump instruction is often utilized in prior art computers. This instruction, by way of example, may be inserted into the computer, by an operator, through a manual push-button, and may be used to cause the CPU to jump to some predetermined instruction. Further, by way of example, the jump instruction may be used to restart the program. In the prior art, circuitry which often utilized logic components, such as gates, generated the jump instruction. As will be seen in the present invention, the jump instruction is, in effect, the lack of any instruction, that is, all zeroes or all ones, and may be generated by inhibiting the communication of an instruction from a memory to the CPU in a multi-chip MOS computer by, for example, either grounding all the data bus lines or applying a signal representative of a binary one to all the lines.

SUMMARY OF THE INVENTION

Improvements in an MOS computer employing a plurality of separate chips is described. A CPU status latch is coupled to a plurality of the bidirectional data bus lines which communicate with the CPU and other components in the computer such as read-only-memories. The CPU generates status signals which are periodically coupled to the data bus lines. Simultaneously with the coupling of the CPU status signals to the bus lines, the CPU generates a strobe signal which is communicated to the status latch. The status latch upon receiving the strobe signal senses the CPU status signal directly from the data bus lines. This eliminates the pins associated with the prior art encoded CPU status signals.

A special jump instruction is utilized consisting of all zeroes or all ones. This special instruction is inserted onto the bidirectional bus lines in one embodiment, by inhibiting the flow of an instruction from a read-only-memory containing the program. The inhibiter, by way of example, either grounds all the bidirectional data bus lines or applies a signal representative of a binary one to all the lines.

DETAILED DESCRIPTION OF THE INVENTION

Figure 1:
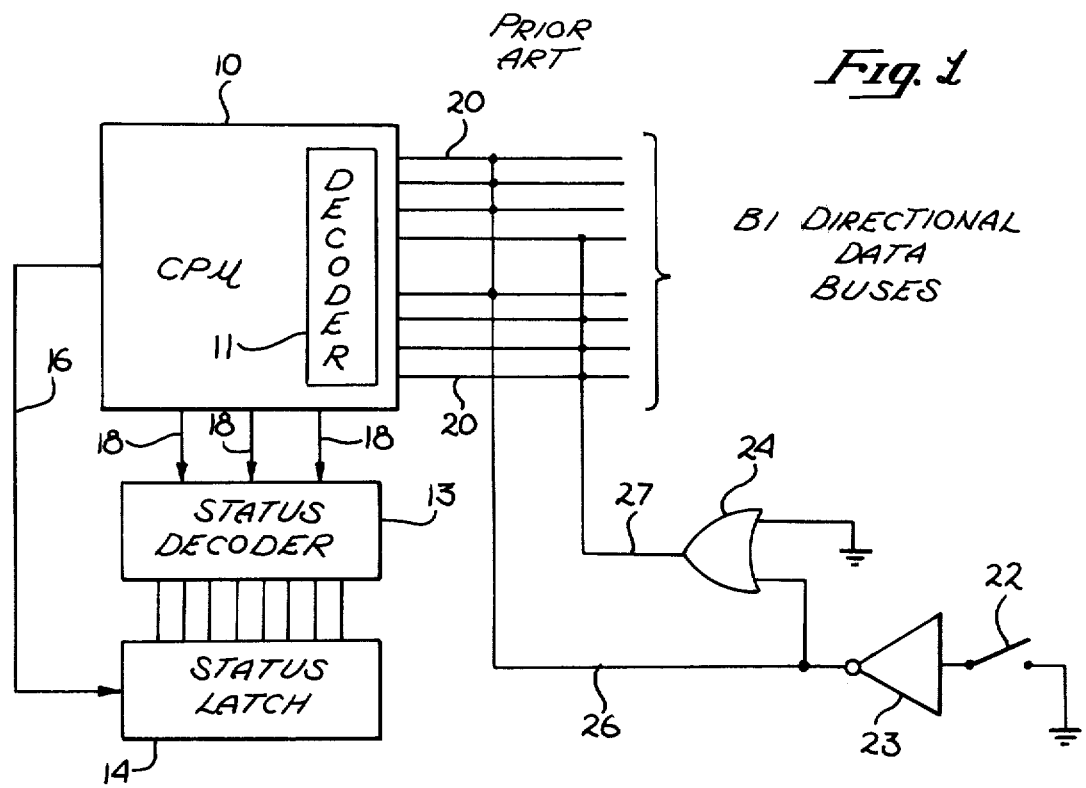
FIG. 1 is a block diagram illustrating a portion of a prior art MOS computer and particularly illustrating the CPU, bidirectional data bus lines, status decoder, status latch and logic circuitry associated with the generation of a special instruction.

Referring to FIG. 1, the portion of the prior art MOS computer illustrated includes a central processing unit (CPU) 10 and a plurality of bidirectional data bus lines 20. The bidirectional data bus lines communicate with other parts of the computer, particularly read-only-memories (ROMs), random-access-memories (RAMs), input/output lines or other computers, as known in the art. In prior art MOS multi-chip computers, each memory and the CPU are disposed on separate silicon chips or substrates and interconnected, for example, on a printed circuit board. It is often desirable during the operation of such computers to know the status of the CPU 10. It may be necessary to know if the CPU 10 is holding, waiting to receive information, or if the CPU is coupled to the input/output bus, or many other conditions.

As shown in FIG. 1, in order to obtain this status information, the CPU 10 generates an encoded signal which is coupled to the status decoder 13 by lines 18. The encoded signal for the circuit shown comprises 3 bits, and hence one of 8 possible states may be communicated to the status decoder 13. The status decoder 13 which is an ordinary logic circuit, decodes the signal received on lines 18 and determines which one of the 8 status states exists in the CPU. A signal representing the status is then coupled to the status latch 14. A strobe signal is sent (on line 16) from the CPU 10 to the status latch 14. This signal is transmitted to the status latch 14 approximately simultaneously with the transmission of the encoded status signal (on lines 18) to the status decoder 13. The status latch upon receiving the strobe signal on line 16 senses the decoded status and stores the decoded signal representing the then existing CPU status. The status latch 14 may be an ordinary latch circuit well known in the art.

As is apparent from FIG. 1, if the CPU 10 is disposed on a separate substrate, three lines 18 are required in order to convey the encoded CPU status signal to the decoder 13. Thus, for a multi-chip MOS computer, three pin connections are required for the encoded signal to be transmitted from the CPU.

Figure 2:
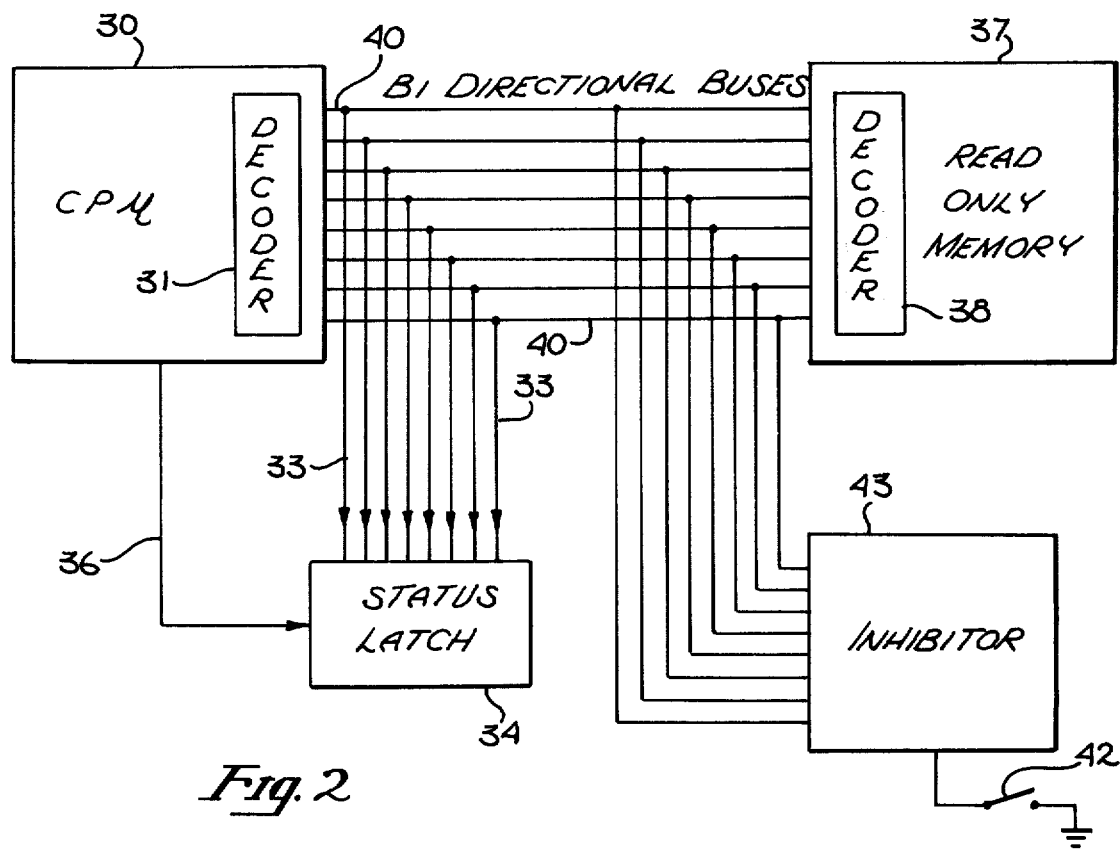
FIG. 2 is a block diagram illustrating a portion of a multi-chip MOS computer fabricated in accordance with the present invention.

Referring to FIG. 2, the CPU 30 may be generally a known prior art CPU preferably disposed on a separate silicon substrate. The CPU 30 communicates with other parts of the computer shown in FIG. 2, including the ROM 37 through a plurality of bidirectional data bus lines 40. While only a single ROM is shown in FIG. 2, it will be appreciated that the computer of FIG. 2 could include a plurality of ROMs, RAMs, input/output devices and other components coupled to the bidirectional data lines. A status latch 34 which may be similar to the status latch 14 of FIG. 1 is interconnected with the 8 bidirectional data bus lines 40 through a plurality of lines 33. A line 36 interconnects the CPU 30 with the status latch 34 and provides a strobe signal from the CPU 30 indicating that the status latch 34 should sense the signal present on lines 33. The strobe signal generated by the CPU 30 on line 36 may be similar to the strobe signal generated by CPU 10 on line 16, and hence may be generated by means well known in the prior art. The status latch 34 may be any one of a plurality of known storage means for storing a digital signal such as a plurality of flip-flops.

In comparing the CPU status sensing means of FIGS. 1 and 2, it is apparent that the lines 18 of FIG. 1 are not required for the computer of FIG. 2, and hence the 3 pins required by the prior art may be eliminated or utilized for other purposes. The CPU 30 of FIG. 2 generates status signals and transmits them to the bidirectional buses utilizing known circuits. Unlike the prior art computer of FIG. 1 though, the status signals need not be encoded.

Referring again to FIG. 1, in prior art computers it is often desirable to have a special instruction often referred to as a jump instruction which causes the selection of an out of sequence instruction. For example, the jump instruction could cause the program to start at its beginning, or could cause a jump to a special program. Such an instruction could be applied to the computer by an external means such as by an operator depressing a button.

Referring to FIG. 1, a manually operated switch 22 is illustrated for applying a jump instruction to the illustrated prior art computer. It is coupled to the input of an inverter 23; the output of the inverter 23, line 26, is coupled to one input terminal of OR gate 24 and to a plurality of the bidirectional data bus lines 20. The other input terminal of the OR gate 24 is coupled to ground, the output of OR gate 24, line 27, is coupled to those bidirectional data bus lines 20 not coupled to line 26. It is apparent that upon the actuation of switch 22 a predetermined binary word which will include both zeroes and ones will be generated and transmitted to the CPU 10. The decoder 11 of CPU 10 which may be an ordinary digital decoder, interprets the word generated by the inverter 23 and OR gate 24 as a jump instruction and the CPU operates upon this jump instruction in a normal manner. While the prior art circuit of FIG. 1 includes an inverter 23 and an OR gate 24, numerous other circuits are known in the prior art for generating a predetermined jump instruction.

Referring to FIG. 2, the CPU 30 of the present invention again includes a decoder 31 which may be similar to the decoder 11 of FIG. 1, this decoder being part of the CPU 30 and being adaptable for recognizing a predetermined jump instruction. The decoder 31 is coupled to the plurality of bidirectional data bus lines 40. In the presently preferred embodiment the decoder 31 recognizes as the special instruction or jump instruction a binary word wherein all the logic states of the binary word are the same. That is, the word consists either of all zeroes or all ones.

The inhibitor 43 of FIG. 2 is coupled to a manually operated switch 42. Inhibitor 4 may be any circuit means for (a) interrupting the bidirectional data bus lines 40 so that information cannot flow between CPU 30 and ROM 37, or (b) circuit means for applying all ones or all zeroes to the bidirectional data bus lines 40. Thus, inhibitor 43 could simply ground all the bidirectional data bus lines 40 or apply a predetermined potential to these lines, said potential representing a binary one.

Thus, in operation assume that a jump instruction is to be inserted onto the bidirectional data bus lines 40. This may be readily done by inhibitor 43 by inhibiting the flow of data on the bidirectional lines, by grounding the lines or by applying the same potential to all the lines. Note that the more complicated logic circuitry associated with the prior art special instruction or jump instruction are not required since the jump instruction was selected to have all zeroes or all ones. Note that it may be desirable to use internal ROM circuitry for the inhibitor such or the chip select/deselect circuitry.

Several advantages are obtained from use of a jump instruction having all zeroes or all ones. For example, assume that the decoder 38 of ROM 37 receives an address on the bidirectional data bus lines 40 which it does not recognize. This invalid address could, for example, be beyond the range of the data stored within the ROM 37 (or other ROMs coupled to the bidirectional data bus lines 40). When this address is received by ROM 37 since the memory does not recognize the address, no data will be transmitted back to the CPU 30. This no-data condition will appear on the data bus lines as all ones or all zeroes and the decoder 31 of CPU 30 upon recognizing this special instruction or jump instruction would take the predetermined appropriate action determined by the jump instruction. The jump instruction comprising all zeroes or all ones, in addition to being easier to implement and saving circuitry over the prior art, has additional benefits of providing a jump instruction on the occurrence of a fault.

Thus, improvements in an MOS computer have been disclosed which enable the fabrication of a multi-chip MOS digital computer for less cost and with more potential capability than with similar prior art computers.

We claim:

1. In an MOS computer employing a plurality of separate chips including a separate central processing unit chip (CPU chip) and a plurality of bidirectional data bus lines coupled to said CPU chip and one or more of said plurality of separate chips, the improvement comprising:
   a CPU status storage means for storing signals representative of the status of said CPU chip; and
   a plurality of lines coupled to said CPU status storage means and said bidirectional data bus lines for interconnecting said bidirectional data bus lines with said CPU status storage means:
   whereby said signals representative of the status of said CPU chip are communicated to said CPU status storage means through said bidirectional data bus lines.

2. The improvement defined by claim 1 including a strobe signal line interconnecting said CPU with said CPU status storage means.

3. An MOS computer comprising:

A central processing unit (CPU) disposed on a first chip, said CPU including a decoder for recognizing a jump instruction, said jump instruction comprising bits of only the same logic state;
at least one memory disposed on a second chip;
a plurality of bidirectional data bus lines interconnecting said CPU with said memory; and
circuit means coupled to said bidirectional data bus lines for applying to said lines said jump instruction.

* * * * *